(12) United States Patent
Tang

(10) Patent No.: US 7,576,999 B2
(45) Date of Patent: Aug. 18, 2009

(54) EXPANSION CARD RETENTION ASSEMBLY

(75) Inventor: Zi-Ming Tang, Shenzhen (CN)

(73) Assignees: Hong Fu Jin Precision (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/126,992

(22) Filed: May 26, 2008

(65) Prior Publication Data

US 2009/0168377 A1 Jul. 2, 2009

(30) Foreign Application Priority Data

Dec. 27, 2007 (CN) .......................... 2007 1 0203446

(51) Int. Cl.
*H05K 7/12* (2006.01)
(52) U.S. Cl. ................ 361/801; 361/726; 361/732; 361/759; 361/747; 312/223.2
(58) Field of Classification Search ................ 361/726, 361/732, 747, 759, 801; 312/223.1, 223.2
See application file for complete search history.

(56) References Cited

U.S. PATENT DOCUMENTS

| 6,809,922 | B2 * | 10/2004 | Lin et al. ................. 361/679.4 |
| 6,960,720 | B2 * | 11/2005 | Wen-Lung .................... 174/50 |
| 7,054,164 | B2 * | 5/2006 | Shih-Tsung ................. 361/801 |
| 7,120,032 | B2 * | 10/2006 | Lin et al. ..................... 361/801 |

* cited by examiner

*Primary Examiner*—Dameon E Levi
(74) *Attorney, Agent, or Firm*—Zhigang Ma

(57) ABSTRACT

An exemplary retention assembly (30) is used to assemble an expansion card. The expansion card is mounted to an expansion card bracket (22) attached to an enclosure (24) The retention assembly includes a latching structure and a frame (36). The latching structure has a first latching portion (342) and the latching structure is configured to resist the expansion card bracket. The latching structure is slidable along a first direction to move away from or close to the expansion card bracket. The frame is fixed relative to the enclosure. The frame has a catching protrusion (366) for engaging with the first latching portion of the latching structure. Either the first latching portion of the latching structure or the catching protrusion of the frame is deformable, such that the first latching portion and the catching protrusion can engage with or disengage from each other.

11 Claims, 4 Drawing Sheets

EXPANSION CARD RETENTION ASSEMBLY

BACKGROUND OF THE INVENTION

1. Field of the Invention

The present invention generally relates to retention assemblies for securing expansion cards to an electronic device enclosure.

2. Discussion of the Related Art

Referring to FIG. 4, a typical retention assembly for securing an expansion card to an electronic device enclosure 13 is shown. The retention assembly includes a catching plate 11, a plurality of bolts 12, and a plurality of covers 14. The electronic device enclosure 13 defines an expansion slot (not labeled). A bulge 132 is formed surrounding a periphery of the expansion slot. The covers 14 are configured for covering the expansion slot and securing/protecting the expansion cards. Each of the covers 14 is an elongated piece having a bent portion (not labeled) adjoining to the bulge 132. When an expansion card is fixed to the electronic device enclosure 13, the catching plate 11 is positioned on the bent portions of the covers 14, and is fixed on the electronic device enclosure 13 by the bolts 12, thereby fastening the covers 14 to the electronic device enclosure 13.

In the above retention assembly, the covers 14 are secured to the electronic device enclosure 13 by using the bolts 12. However, installing or removing the bolts 12 is unduly time-consuming and laborious. This leads to lower efficiency of installation and removal of expansion cards. In addition, a tool for installing or removing bolts is needed in installation or removal. These problems are multiplied in mass production facilities. Furthermore, when used for a period of time, bolts 12 and the screw holes cannot reliably engage with each other any more.

Therefore, a retention assembly which overcomes the above-described shortcomings is desired.

SUMMARY

An exemplary retention assembly is used to assemble an expansion card mounted to an expansion card bracket to an enclosure. The retention assembly includes a latching structure and a frame. The latching structure has a first latching portion and the latching structure is configured to resist the expansion card bracket. The latching structure is slidable along a first direction to move away from or close to the expansion card bracket. The frame is fixed relative to the enclosure. The frame has a catching protrusion for engaging with the first latching portion of the latching structure. Either the first latching portion of the latching structure or the catching protrusion of the frame is deformable, such that the first latching portion and the catching protrusion can engage with or disengage from each other.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the retention assembly. Moreover, in the drawings, like reference numerals designate corresponding parts throughout the several views.

DETAILED DESCRIPTION OF THE EMBODIMENTS

Figure 1:
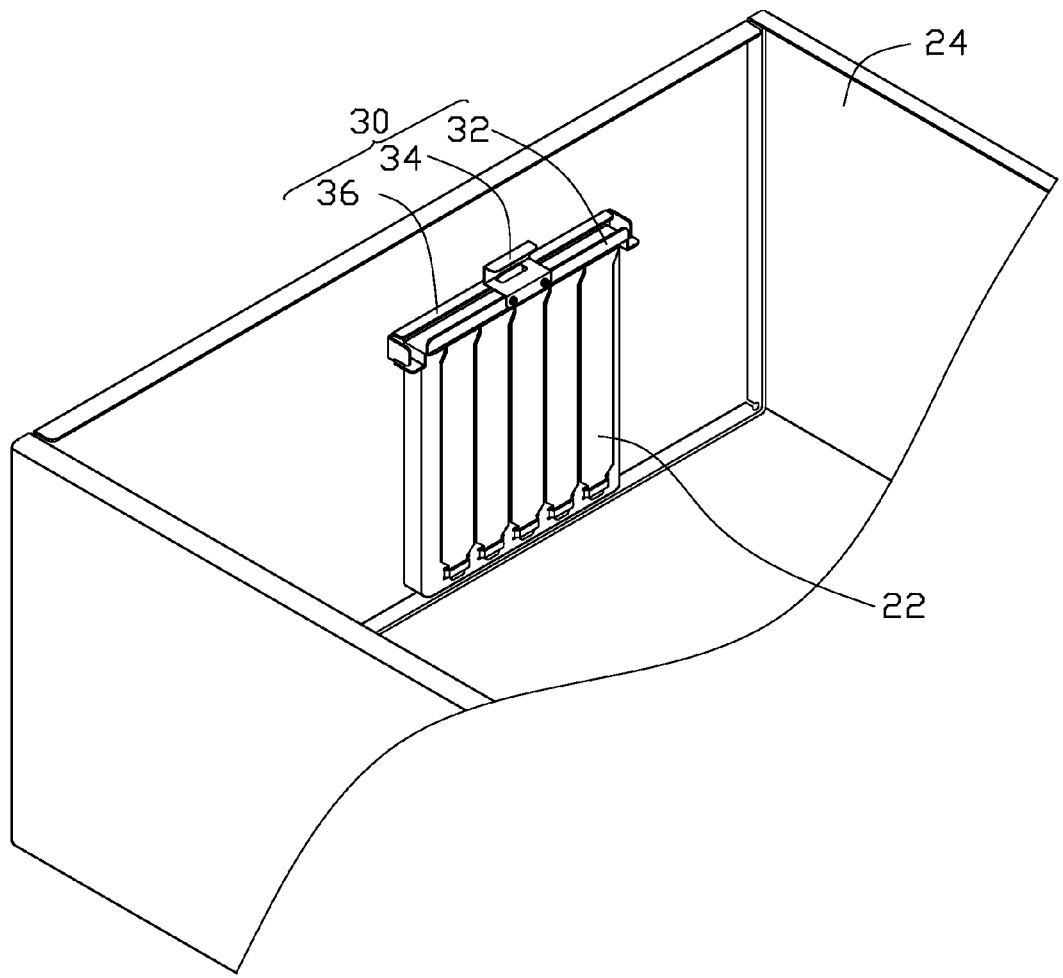
FIG. 1 is an assembled, isometric view of a retention assembly in a closed state in accordance with an exemplary embodiment of the present invention, and showing the retention assembly assembled to an enclosure.

Referring to the drawings in detail, FIG. 1 shows a retention assembly 30 of an exemplary embodiment of the present invention assembled in one wall of an enclosure 24 such as an electronic device enclosure. The retention assembly 30 is configured to fasten expansion card brackets 22 of expansion cards (not shown) to an expansion card seat of the enclosure 24.

Figure 2:
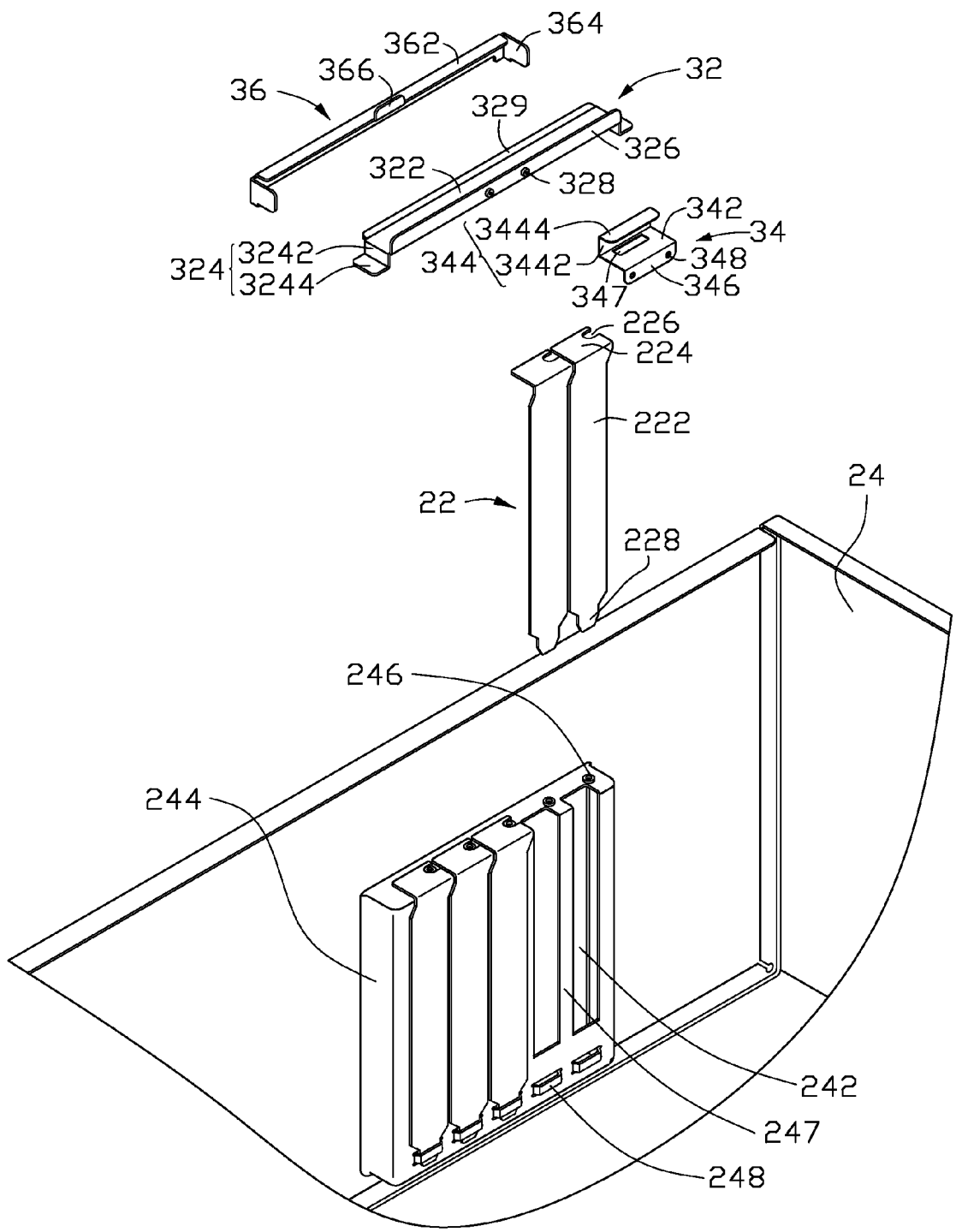
FIG. 2 is a partially exploded, isometric view of the retention assembly and the enclosure of FIG. 1.

For the exemplary purposes, only one expansion bracket 22 and one expansion card seat will be detailed to more clearly describe the exemplary embodiment. Referring to FIG. 2, the expansion card bracket 22 includes an elongated main portion 222 and a fastening portion 224 extending perpendicularly from an end of the elongated main portion 222. An edge of the fastening portion 224 defines a notch 226. The expansion card bracket 22 further includes a tab 228 extending from another end of the elongated main portion 222 opposite to the fastening portion 224. A width of the tab 228 is smaller than that of the main portion 222.

The enclosure 24 includes an expansion card platform (rack) 244. The platform 244 extends perpendicularly inwards forming at least one expansion card seat 247. For the exemplary purposes, only one expansion card seat 247 will be described to more clearly disclose the exemplary embodiment. The expansion card seat 247 defines a cutout 242 extending from a side of the platform 244 to an opposite side of the platform 244. The expansion card seat 247 further forms a positioning member 246 on a first surface and corresponding to the cutout 242, and a hooking member 248 adjacent to a second surface and corresponding to the cutout 242. The positioning member 246 is configured to be received in the notch 226 and the hooking member 248 is configured to be insertable by the tab 228. In the illustrated embodiment, the platform 244 is substantially rectangular in shape, and has four surfaces including the first surface and the second surface opposite to each other.

The retention assembly 30 includes a removable holder 32, a latching catch 34, and a frame 36.

The removable holder 32 is an elongated cap preferably having a length corresponding to that of the first surface of the enclosure 24. The removable holder 32 includes a holding piece 322, two engaging pieces 324, and a connecting portion 326. The engaging pieces 324 are formed at opposite ends of the holding piece 322. Each engaging piece 324 is L-shaped and includes an extending portion 3242 perpendicular to the holding piece 322 and a resisting portion 3244 perpendicular to the extending portion 3242 correspondingly. The connecting portion 326 extends along a side of the holding piece 322 between the engaging pieces 324. Two connecting protrusions 328 are formed on an outer surface of the connecting portion 326. A resilient bulge 329 is formed on another side of the holding piece 322 opposite to the connecting portion 326.

The latching catch 34 includes a first latching portion 342, a handle 344, and a second latching portion 346. The latching portion 342 defines a latching slot 347. The handle 344 includes an extending piece 3442 perpendicular to the first latching portion 342 and a pulling piece 3444 perpendicular to the extending piece 3442. The second latching portion 346 extends perpendicularly from a side of the first latching portion 342 toward a direction away from the handle 344. The second latching portion 346 defines two catching holes 348 configured for catching the connecting protrusions 328 of the removable holder 32, thus fixing the latching catch 34 to the removable holder 32.

The frame 36 is an elongated frame preferably having a length corresponding to that of the first surface of the enclosure 24. The frame 36 includes a main body 362, two limiting pieces 364 extending from opposite ends of the main body 362, and a catching protrusion 366 extending from a middle portion of the main body 362. The limiting pieces 364 are configured for engaging with the engaging pieces 324, and the main body 362 is configured for resisting the bulge 329 of the removable holder 32 when in a closed state, thus preventing the removable holder 32 from sliding along a first direction perpendicular to the fastening portion 224 of the expansion card bracket 22 and a second direction parallel to an extending direction of the holding piece 322 of the removable holder 32. The catching protrusion 366 is configured for engaging in the latching slot 347 of the latching catch 34, thus preventing the removable holder 32 from sliding along a third direction perpendicular to the first and second directions. As such, the removable holder 32 can be held securely, thus fastening the expansion card brackets 22.

To assemble the retention assembly 30, the frame 36 is fixed to the enclosure 24 and is positioned corresponding to the platform 244. The connecting protrusions 328 of the removable holder 32 engages in the catching holes 348 of the latching catch 34, and the connecting protrusions 328 are riveted so as to fix the latching catch 34 to the removable holder 32. In this embodiment, the frame 36 is fixed to the enclosure 24 by welding. Alternatively, other manners such as riveting, screwing may be employed. The latching catch 34 may be fixed to the removable holder 32 by other manners such as welding and screwing.

In use, the retention assembly 30 has two states, an opened state and the closed state. Referring to FIG. 1 again, in the closed state, the retention assembly 30 holds the expansion card, if any, in the enclosure 24, the tab 228 of the expansion card bracket 22 is inserted into the hooking member 248 and notch 226 of the expansion card bracket 22 is engaged with the positioning member 246. In the closed state, the removable holder 32 pushes the fastening portion 224 of the expansion card bracket 22 against the platform 244. The engaging pieces 324 of the removable holder 32 are resisted by the limiting pieces 364 of the frame 36, the bulge 329 of the removable holder 32 is resisted by the main body 362 of the frame 36, and the latching slot 347 of the latching catch 34 engages with the catching protrusion 366 of the frame 36. Thus the removable holder 32 is non-slidable.

Figure 3:
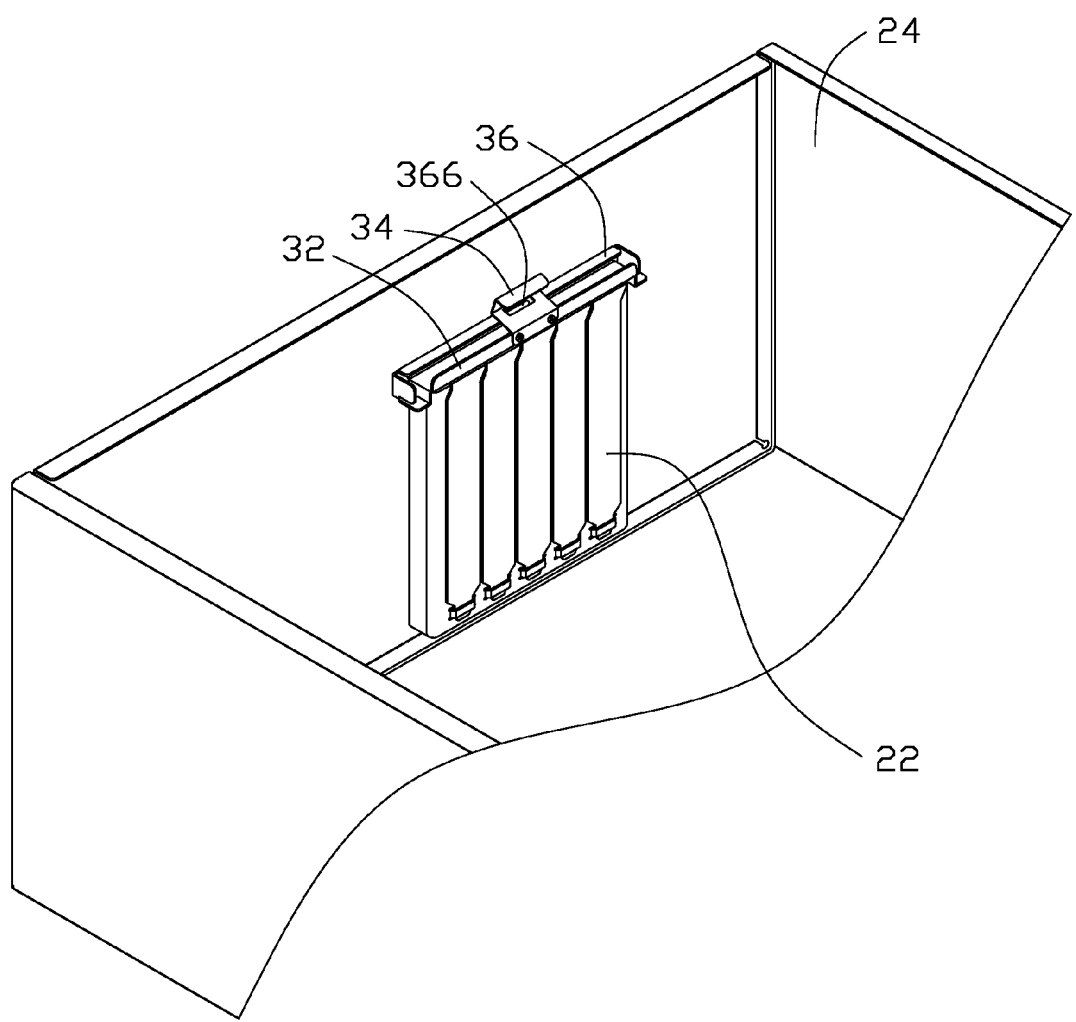
FIG. 3 is similar to FIG. 1, but showing an opened state of the retention assembly.
Figure 4:
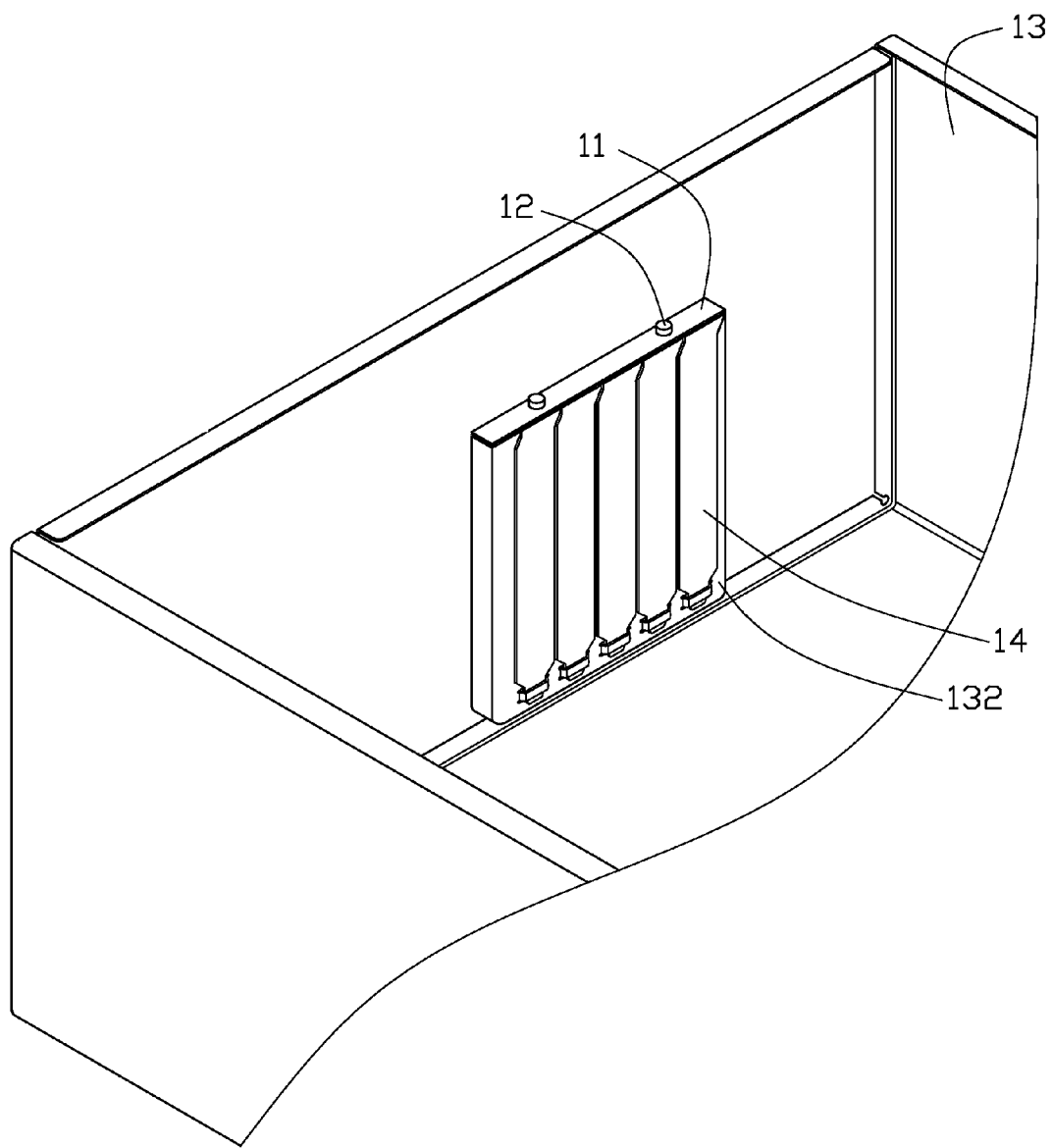
FIG. 4 is an assembled, isometric view of a conventional retention assembly assembled to an enclosure.

Referring to FIG. 3, to add or remove extra expansion cards, the retention assembly 30 is pulled from the closed state to the opened state. The handle 344 of the latching catch 34 is pulled from a closed position to an opened position to make the handle 344 and the first latching portion 342 to be deformed, such that the first latching portion 342 of the latching catch 34 is detached from the catching protrusion 366 of the frame 36. Then the latching catch 34 and the removable holder 32 are moved along the third direction so as to remove the removable holder 32 from the expansion card brackets 22. As such, the expansion card brackets 22 can then be removed from or inserted into an empty expansion card seat 247. When the expansion card brackets 22 have been installed onto or detached from the enclosure 24, the removable holder 32 together with the latching catch 34 is moved close to the frame 36 and the expansion card brackets 22. The removable holder 32 is positioned between the frame 36 and the expansion card brackets 22. The handle 344 of the latching catch 34 is pulled to make the handle 344 and the first latching portion 342 become deformed, such that the first latching portion 342 of the latching catch 34 engages with the catching protrusion 366 of the frame 36.

Alternatively, the frame 36 may be a part of the enclosure 24. The latching slot 347 may be defined in the frame 36, and the catching protrusion 366 may be formed on the latching catch 34 correspondingly. The latching slot 347 of the latching catch 34 may be replaced by a latching piece for engaging with the catching protrusion 366 of the frame 36. The removable holder 32 and the latching catch 34 may be a latching structure integrally formed.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A retention assembly for assembling an expansion card, the expansion card being mounted to an expansion card bracket attached to an enclosure, the retention assembly comprising:

a latching structure having a first latching portion configured to resist the expansion card bracket, and the latching structure being slidable along a first direction to move away from or close to the expansion card bracket, the latching structure comprising a removable holder and a latching catch forming the first latching portion and a second latching portion, the removable holder being configured to resist the expansion card bracket, the removable holder comprising a holding piece, two engaging pieces formed at opposite ends of the holding piece, and a connecting portion forming at least one connecting protrusion, the second latching portion defining at least one catching hole, and the at least one catching hole is configured for engaging with the at least one connecting protrusion, thus fixing the latching catch to the removable holder; and a frame fixed relative to the enclosure, the frame having a catching protrusion for engaging with the first latching portion of the latching structure, the frame comprising a main body and two limiting pieces extending from opposite ends of the main body, and the limiting pieces of the frame engaging with the engaging pieces for positioning the removable holder;

wherein either the first latching portion of the latching structure or the catching protrusion of the frame is deformable, such that the first latching portion and the catching protrusion can engage with or disengage from each other.

2. The retention assembly as claimed in claim 1, wherein the removable holder further comprises a resilient bulge for resisting the main body of the frame.

3. The retention assembly as claimed in claim 1, wherein the removable holder is an elongated frame, each engaging piece is L-shaped and includes an extending portion perpendicular to the holing piece and a resisting portion perpendicular to the extending portion, and the connection portion is formed at one side of the holding piece and is between the engaging pieces.

4. The retention assembly as claimed in claim 1, wherein the first latching portion of the latching catch defines a latching slot therein, and the catching protrusion of the frame engages in the latching slot.

5. The retention assembly as claimed in claim 4, wherein the latching catch further comprises a handle, the handle has an extending piece perpendicular to the first latching portion and a pulling piece perpendicular to the extending piece, the second latching portion extends perpendicularly from a side of the first latching portion in a direction reverse to the handle.

6. The retention assembly as claimed in claim 1, wherein each expansion card bracket comprises an elongated main portion, a fastening portion formed at an end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to an opposite side surface of the platform, the expansion card seat further forms a positioning member on a first surface corresponding to the cutout, and a hooking member adjacent to a second surface opposite to the first surface and corresponding to the cutout, the positioning member is configured to be received in the notch and the hooking member is configured to be insertable by the tab, and the fastening portion of each expansion card bracket is held between the first surface and the latching structure.

7. The retention assembly as claimed in claim 6, wherein the platform of the enclosure is substantially rectangular, and has four surfaces including the first surface and the second surface.

8. A retention assembly for assembling an expansion card, the expansion card being mounted to an expansion card bracket attached to an enclosure, the retention assembly comprising:
   a latching structure having a first latching portion, the latching structure configure to resist the expansion card bracket, the latching structure comprising a removable holder and a latching catch forming the first latching portion and a second latching portion, the removable holder being configured to resist the expansion card bracket, the removable holder comprising a holding piece, two engaging pieces formed at opposite ends of the holding piece, and a connecting portion forming at least one connecting protrusion, the second latching portion defining at least one catching hole, and the at least one catching hole is configured for engaging with the at least one connecting protrusion, thus fixing the latching catch to the removable holder; and
   a frame fixed relative to the enclosure, the frame having a catching protrusion for engaging with the first latching portion of the latching structure, the frame comprising a main body and two limiting pieces extending from opposite ends of the main body, and the limiting pieces of the frame engaging with the engaging pieces for positioning the removable holder;
   wherein when adding or removing the expansion card bracket, the latching structure is moved to slide towards and between the frame and the expansion card bracket, and then one of the first latching portion and the catching protrusion is pulled to be deformed to engage with the other one of the first latching portion and the catching protrusion, when the expansion card bracket have been added or removed, one of the first latching portion and the catching protrusion is pulled to be deformed to disengage from the other one of the first latching portion and the catching protrusion, and the latching structure is moved to slide away from the frame and the expansion card bracket.

9. The retention assembly as claimed in claim 8, wherein the removable holder further comprises a resilient bulge for resisting the main body of the frame.

10. The retention assembly as claimed in claim 9, wherein the first latching portion of the latching catch defines a latching slot, and the catching protrusion of the frame is engaged in the latching slot.

11. The retention assembly as claimed in claim 8, wherein each expansion card bracket comprises an elongated main portion, a fastening portion formed at one end of the main portion, and a tab formed at an opposite end of the main portion, the fastening portion defines a notch at an edge, the enclosure comprises an expansion card platform, the platform extends perpendicularly inwards forming at least one expansion card seat, the expansion card seat defines a cutout extending from a side of the platform to an opposite side of the platform, the expansion card seat further forms a positioning member on a first surface corresponding to the cutout, and a hooking member adjacent to a second surface opposite to the first surface and corresponding to the cutout, the positioning member is configured to be received in the notch and the hooking member is configured to be insertable by the tab, and the fastening portion of each expansion card bracket is held between the first surface and the latching structure.

* * * * *